April 25, 1950     C. E. MILDÉ     2,505,500
INDUCTION CLUTCH
Filed Aug. 31, 1946
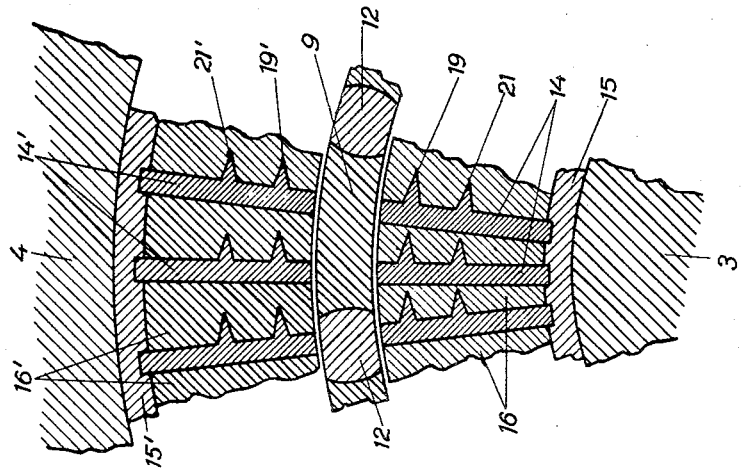
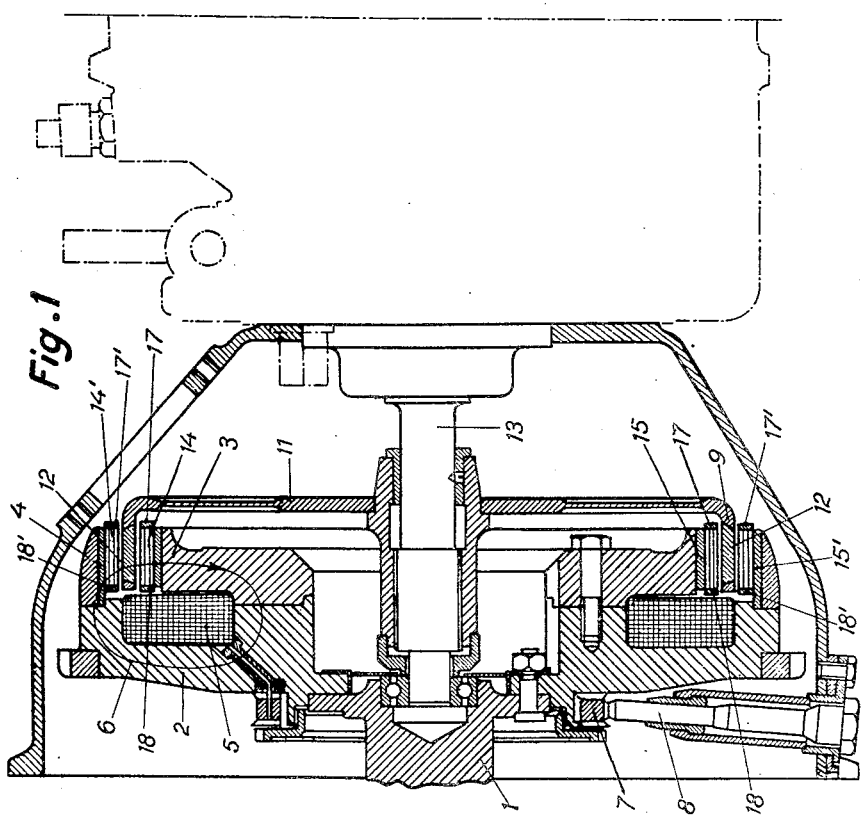
INVENTOR
Charles Emmanuel Milde
BY
ATTORNEY Patented Apr. 25, 1950

2,505,500

UNITED STATES PATENT OFFICE 2,505,500

INDUCTION CLUTCH

Charles Emmanuel Mildé, Paris, France

Application August 31, 1946, Serial No. 694,285
In France March 29, 1945

Section 1, Public Law 690, August 8, 1946
Patent expires March 29, 1965

5 Claims.  (Cl. 172—284)

In French patent specification Serial No. 908,722 of October 4, 1943, there is described a clutch of the type in which the intersection of two shafts, one being a driving and the other a driven shaft, is effected by reaction taking place between a magnetic field and induced currents.

In this specification provision is made for arranging the induction ring members on an electro magnet in the form of two squirrel cages and for substituting for the primary induction component of previously known clutches a notched crown the edge of which is disposed between the two squirrel cages and which then operates as an inductor crown. Such disposition was in itself known, but according to said specification the primary induction component for the two squirrel cages is tied to the motor for which it serves as flywheel, whilst the inductor crown, which is made as light as possible and consequently has a very low moment of inertia, is connected with the shaft of the change-speed gear. One form of a particularly light inductor crown is specifically described in the addition to said specification, filed April 17, 1944, No. 53,575.

In afore-said patent specification there is further pointed out that in previously proposed clutches of this kind two ways of operation were obtainable, viz.:

(1) A so-called synchronous speed operation, in which the driving and driven shafts rotate practically at one and the same speed;

(2) A coupling operation with slip, in which the driven shaft rotates at a lesser speed than that of the driving shaft.

The invention described in the afore-said patent specification consists particularly in adjusting the ratio of the number of teeth in the primary induction component to the number of poles of the inductor crown in such a way as to render impossible magnetic drag. To this end it is prescribed that the number of teeth in the primary induction component should be substantially greater than the number of poles of the inductor crown. By way of example, it is proposed to use primary induction components having at least four teeth for each pole of the inductor crown.

It has been found, however, that the observance of these prescriptions alone is not sufficient for doing away with magnetic drag and with couples originating in residual magnetism due to harmonics of the toothed system, such couples, though insufficiently strong for bringing about an engagement in synchronism, being liable to produce noise.

It is an object of the present invention to provide a clutch of the type referred to in which the number of teeth selected for the primary induction component and the number of poles selected for the inductor crown are such as to be indivisible one by the other exactly.

It is a further object of the present invention to provide a clutch of the type referred to in which the number of teeth selected for the primary induction component and the number of poles selected for the inductor crown are such that their ratio does not approach a simple fraction, such simple fraction being defined as a fraction whose denominator is, e. g., inferior to 10 after simplification.

It is yet a further object of the present invention to provide a clutch of the type referred to in which the number of teeth of the primary induction component relative to the number of poles of the inductor crown is sufficiently high for reducing the amplitude of harmonics of the toothed system and also for rendering the frequency of vibrations generated by these harmonics superior to the maximum audible frequency of a sounding vibration.

For example, if the number of teeth of the primary induction component be equal to 868, the number of poles of the inductor crown may be 34.

The manufacture of such squirrel-cage primary induction components having a large number of teeth may be carried out by following the method described in French patent application filed July 13, 1944, by Messrs. Dimitri Sensaud De Lavaud and Charles Emmanuel Milde for improvements in "Short-circuit primary induction components for electromagnetic clutches and other applications." According to the present invention, it will be advantageous to make use of rectangular copper bars ledged in deep notches so as to increase the electric resistance at the time of high slippage. It will also be advantageous that such copper bars should present more or less complete magnetic isthmuses at certain distances from the notch, so as to create multiple cages.

In the accompanying drawing there is shown in Fig. 1 by way of example, a longitudinal section of a complete clutch in accordance with the invention, and in Fig. 2, there is shown a view in partial cross-section of the two squirrel cages of the driving member and of the driven crown moving therebetween.

In Fig. 1, the driving shaft 1 actuates a magnet member 2 mounted thereon and including two concentric pole portions 3 and 4. These portions, which are concentric with the driving shaft form the propulsion part of the device. An electric winding 5 positioned concentrically in this assembly renders it a homopolar inductor in which the field is distributed, its lines of force, in each radial plan, being positioned as schematically indicated by the closed line 6. This coil is fed direct current in a known manner, one of its ends being grounded and the other connected with the insulated metallic ring 7, receiving the current by means of a sliding contact 8. The polar parts 3 and 4 form therebetween a cylindrical space in which there is movably disposed the cylindrical portion 9 of a crown 11 made of a non-magnetic material, such as a light alloy, the function of which is to carry embedded in the portion thereof which moves between the two portions 3 and 4, the magnetic bars 12. Said crown 11, carried by the outgoing shaft 13 of the clutch, is the driven part and the movement of its bars 12 between the magnetic parts 14 and 14' creates variations in magnetic flux circulating in the direction of the closed lines 6, said variations generating in the squirrel cages induction currents, rendering stronger the pull on the driven part by the driving part, which pull is never complete owing to the high ratio between the number of magnetic pieces of the squirrel cages to that of the bars 12.

The two polar parts 3 and 4 are provided with similarly constructed squirrel cages as shown in detail in Fig. 2.

The inner cage includes blades of soft iron 14 and a magnetic ring 15 which is force fitted onto the polar part 3 of the electro-magnet. The assembly is embedded in the copper 16 which extends laterally to form the rings 17 and 18 of the squirrel cage, of which the copper parts 16 form its bars.

The outer cage is similarly constituted by corresponding elements bearing the reference numbers 14', 15', 16', 17' and 18' in Figs. 1 and 2. The magnetic ring 15' is shown force fitted to the polar part 4.

The inner and outer cylindrical walls of both cages are formed with respect to the primary induction component so as to enable this component to be separated from the corresponding inductor ring by as small an air gap as possible.

Each iron lamination 14 has two projections 19 and 21, of triangular section, forming magnetic isthmuses in the mas of copper 16, whereby there is formed a primary induction component whose current is localized in the vicinity of the air gap for high frequencies, while being uniformly distributed in the said mass of copper for low slips. The torque is therefore increased for high slips, whereby starting is facilitated and a reduced slip at normal running speed is nevertheless maintained. In one form of apparatus selected by way of example the relative heights of the three zones are 5/8, 2.1/8, 0.9/8, the highest one being at the bottom of the slot and the lowest one close to the air gap.

The number of projections (19, 21) determining said magnetic isthmuses may be modified with a view to varying the value of the resistance as function of frequency, resulting in varying the torsque as function of slip.

The inductor ring is intended to be made from a non-magnetic material which may be not only a non-magnetic metal such for example as a light alloy, but also any non-magnetic and electrically insulating material such for example a suitable plastic material.

What is claimed is:

1. Induction clutch of the type having for its polyphase primary induction components two squirrel cages mounted on an electromagnet secured to a driving motor for which it serves as flywheel, and for its inductor crown a crown of low moment of inertia having its inductor portion disposed between said two cages, wherein the number of teeth in said primary induction component and the number of poles in said inductor crown are selected so as to be indivisible one by the other exactly.

2. Induction clutch of the type having for its polyphase primary induction component two squirrel cages mounted on an electromagnet secured to a driving motor for which it serves as flywheel, and for its inductor crown a crown of low moment of inertia having its inductor portion disposed between said two cages, wherein the number of teeth in said primary induction component and the number of poles in said inductor crown are selected so that their ratio be remote from a simple fraction.

3. Induction clutch of the type having for its polyphase primary induction component two squirrel cages mounted on an electromagnet secured to a driving motor for which it serves as flywheel, and for its inductor crown a crown of low moment of inertia having its inductor portion disposed between said two cages, wherein the number of teeth in the primary induction components relative to the number of poles in the inductor crown in made sufficiently high for reducing the amplitude of harmonics of the toothed system and, for rendering the frequency of vibrations generated by such harmonics superior to the maximum audible frequency of a sounding vibration.

4. Induction clutch of the type having for its polyphase primary induction component two squirrel cages mounted on an electromagnet secured to a driving motor for which it serves as flywheel, and for its inductor crown a crown of low moment of inertia having its inductor portion disposed between said two cages, wherein the primary induction components are formed with rectangular copper blades lodged in deep notches for the purpose of increasing the electric resistance at the time of high slips.

5. Induction clutch of the type having for its polyphase primary induction component two squirrel cages mounted on an electromagnet secured to a driving motor for which it serves as flywheel, and for its inductor crown a crown of low moment of inertia, said primary induction components being disposed in copper and having projecting portions forming sufficiently complete magnetic isthmuses at certain distances from the slots so as to produce multiple cages.

CHARLES EMMANUEL MILDE.

REFERENCES CITED

The following references are of record in the file of this patent:

UNITED STATES PATENTS

| Number    | Name     | Date          |
|-----------|----------|---------------|
| 2,259,311 | Kilgore  | Oct. 14, 1941 |
| 2,295,019 | Thompson | Sept. 8, 1942 |

FOREIGN PATENTS

| Number  | Country | Date          |
|---------|---------|---------------|
| 585,676 | Germany | Oct. 6, 1933  |
| 908,722 | France  | Oct. 15, 1945 |